United States Patent
Kuenkel et al.

(10) Patent No.: US 10,760,555 B2
(45) Date of Patent: Sep. 1, 2020

(54) PISTON PUMP ASSEMBLY COMPRISING PISTON WITH VARIABLE STROKE AND VEHICLE BRAKING SYSTEM COMPRISING THE SAME

(71) Applicant: MANDO CORPORATION, Pyeongtaek-si, Gyeonggi-do (KR)

(72) Inventors: Axel Kuenkel, Stutensee (DE); Ralf Leiter, Mendig (DE)

(73) Assignee: MANDO CORPORATION, Pyeongtaek-si, Gyeonggi-Do (KR)

(*) Notice: Subject to any disclaimer, the term of this patent is extended or adjusted under 35 U.S.C. 154(b) by 0 days.

(21) Appl. No.: 15/907,537

(22) Filed: Feb. 28, 2018

(65) Prior Publication Data

US 2018/0306172 A1   Oct. 25, 2018

(30) Foreign Application Priority Data

Apr. 21, 2017   (DE) .......................... 10 2017 206 723

(51) Int. Cl.
  *F04B 9/04*    (2006.01)
  *F04B 1/053*   (2020.01)
            (Continued)

(52) U.S. Cl.
  CPC ............ *F04B 9/042* (2013.01); *B60T 8/4018* (2013.01); *B60T 8/4031* (2013.01); *B60T 13/168* (2013.01);
            (Continued)

(58) Field of Classification Search
  CPC ...... F04B 9/042; F04B 49/125; F04B 49/126; F04B 1/0413; F16C 3/28
  See application file for complete search history.

(56) References Cited

U.S. PATENT DOCUMENTS 1,895,259 A * 1/1933 Muller ...................... F02D 1/00
                                                74/568 R 2,393,175 A   1/1946 Laskey
            (Continued)

FOREIGN PATENT DOCUMENTS

CH   157418 A  *  9/1932  ............... F01L 1/08
DE   157418 B     12/1932
            (Continued)

OTHER PUBLICATIONS

Office Action issued in corresponding Korean Application No. 10-2018-0014527, dated Jan. 30, 2019.
            (Continued)

*Primary Examiner* — Thomas E Lazo
(74) *Attorney, Agent, or Firm* — Morgan, Lewis & Bockius LLP

(57) ABSTRACT

The present disclosure relates to a piston pump assembly comprising a piston with a variable stroke and to a hydraulic braking system comprising the same. The piston pump assembly comprises at least: a rotatable drive shaft defining an axis of rotation of the rotatable drive shaft; a cam disposed on the drive shaft; and the piston biased toward the cam and configured to reciprocate along a piston axis for displacing a hydraulic fluid. The cam is movable relative to the piston axis and is selectively placed in one of a first position at a first distance from the piston axis and a second position at a second distance from the piston axis; and wherein the cam comprises at least two portions each of which has, at a given position of the cam relative to the piston axis, a different non-circular cross section in a plane perpendicular to the axis of rotation and/or a different eccentricity with respect to the axis of rotation, the at least two portions of the cam comprising at least a first cam portion having a first non-circular cross section and/or a first eccentricity, and a second cam portion having a second non-circular cross section and/or a second eccentricity.

13 Claims, 12 Drawing Sheets

(51) Int. Cl.
- *F04B 49/12* (2006.01)
- *F04B 1/0413* (2020.01)
- *B60T 8/40* (2006.01)
- *F16D 65/18* (2006.01)
- *B60T 13/16* (2006.01)
- *F04B 19/22* (2006.01)

(52) U.S. Cl.
CPC ............ *F04B 1/0413* (2013.01); *F04B 1/053* (2013.01); *F04B 19/22* (2013.01); *F04B 49/125* (2013.01); *F04B 49/126* (2013.01); *F16D 65/18* (2013.01); *B60T 8/4059* (2013.01); *F04B 2205/10* (2013.01); *F04B 2207/03* (2013.01)

(56) References Cited

U.S. PATENT DOCUMENTS

| | | | | |
|---|---|---|---|---|
| 2,605,710 | A * | 8/1952 | Mashinter | F04B 1/0413 74/55 |
| 2,680,412 | A * | 6/1954 | Entwistle | F04B 1/0408 417/221 |
| 3,073,418 | A | 1/1963 | Bentley | |
| 6,478,548 | B1 * | 11/2002 | Auer | F04B 1/0461 417/221 |
| 8,322,997 | B2 * | 12/2012 | Auer | F04B 49/125 417/221 |

FOREIGN PATENT DOCUMENTS

| | | | |
|---|---|---|---|
| DE | 3720567 A1 | 1/1989 | |
| DE | 4134184 A1 * | 4/1993 | ............ F04B 49/125 |
| DE | 10207362 A1 | 9/2002 | |
| DE | 102009026740 A1 | 12/2010 | |
| GB | 1176933 A * | 1/1970 | ............ F04B 49/125 |
| JP | H05-044634 A | 2/1993 | |

OTHER PUBLICATIONS

German Office Action dated Jul. 9, 2018 issued in German Patent Application No. 102017206723.3.

\* cited by examiner

PISTON PUMP ASSEMBLY COMPRISING PISTON WITH VARIABLE STROKE AND VEHICLE BRAKING SYSTEM COMPRISING THE SAME

CROSS-REFERENCE TO RELATED APPLICATION(S)

This application claims priority to and the benefit of German Patent Application No. 102017206723.3, filed on Apr. 21, 2017 in the German Intellectual Property Office, the disclosure of which is incorporated herein by reference in its entirety.

BACKGROUND

1. Technical Field

The present disclosure relates to a piston pump assembly comprising a piston with a variable stroke and to a vehicle braking system comprising the same.

2. Description of the Related Art

Hydraulic braking systems usually include a hydraulic control unit (HCU) for the regulation of the brake fluid within the two brake circuits. Piston pumps are used to control the pressure in the wheel brake cylinders, empty the low pressure accumulators, and to provide brake fluid in special cases, especially for functional safety reasons such as when the driver does not act.

Piston pumps are mostly driven by a common eccentric unit configured to transform a rotational movement to a linear movement. The eccentric unit usually comprises a metal bushing that is rigidly mounted to the drive shaft of an eccentric motor. At this time, a thinned eccentric shaft end instead of the bushing may be used.

The distance between an axis of rotation of the drive shaft and the bushing may define as the stroke of the piston according to the value of the eccentricity. In the above-described systems, the piston stroke has a fixed value or length.

However, in certain situations it may be advantageous to set the piston stroke to a higher or to a lower value. For example, during the cold-start phase of the vehicle the temperature of the brake fluid is typically low, resulting in a high viscosity of the brake fluid. If the viscosity of the brake fluid is high, the motor driving the piston pump needs to provide a higher torque so that it is preferable to use a high power motor for driving the piston pump.

On the other hand, friction and shear stress acting on the brake fluid typically may cause the viscosity of the brake fluid to decrease over time. Accordingly, by allowing a smaller and less powerful motor to be used to drive the piston pump, energy consumption and production costs may be reduced. However, the piston pump may be sufficiently driven by a low power motor even during the start-up phase when the brake fluid has a relatively high viscosity if the stroke of the piston pump may be reduced until the brake fluid has warmed up and the viscosity has decreased.

U.S. Pat. No. 8,322,997B2 describes an eccentric piston pump comprising a drive shaft section which is designed as an inclined eccentric pin. The eccentric pin has an eccentric pin axis which extends at an oblique angle from the main axis of the drive shaft. An eccentric sleeve is guided on the eccentric pin and has a cylindrical external surface.

However, the drive shaft described in U.S. Pat. No. 8,322,997B2 may be difficult and costly to manufacture.

Therefore, there is demand for a piston pump having a variable stroke that provides a high degree of stability and that may be produced at low cost.

SUMMARY

It is an aspect of the present disclosure to provide a piston pump assembly with a variable stroke to provide a high level of stability under a hydraulic braking system and to be manufactured at low cost.

Additional aspects of the present disclosure will be set forth in part in the description which follows and, in part, will be obvious from the description, or may be learned by practice of the disclosure.

In accordance with one aspect of the present disclosure, there is provided a piston pump assembly comprising a piston with a variable stroke, comprising at least:

a rotatable drive shaft defining an axis of rotation of the rotatable drive shaft;

a cam disposed on the drive shaft; and a piston biased toward the cam and configured to reciprocate along a piston axis for displacing a hydraulic fluid;

wherein the cam is configured to transform a rotating movement of the drive shaft into a linear movement of the piston;

wherein the cam is movable relative to the piston axis and configured to be selectively placed in one of a first position at a first distance from the piston axis and a second position at a second distance from the piston axis; and wherein the cam comprises at least two portions each of which has, at a given position of the cam relative to the piston axis, a different non-circular cross section in a plane perpendicular to the axis of rotation and/or a different eccentricity with respect to the axis of rotation, the at least two portions of the cam comprising at least a first cam portion having a first non-circular cross section and/or a first eccentricity, and a second cam portion having a second non-circular cross section and/or a second eccentricity, wherein the cam and the piston are configured such that when the cam is placed in the first position at the first distance from the piston axis the cam is configured to drive the piston through the first cam portion, resulting in a piston movement having a first stroke, and such that when the cam is placed in the second position at the second distance from the piston axis the cam is configured to drive the piston through the second cam portion, resulting in a piston movement having a second stroke different from the first stroke.

Further, the piston pump assembly comprising a piston with a variable stroke according the present disclosure allows varying the stroke of the piston and the volume of hydraulic fluid displaced by the piston with each revolution of the drive shaft by moving the cam relative to the piston axis to drive the piston selectively through one of the first cam portion and the second cam portion. The cross sections of the first cam portion and of the second cam portion in a plane perpendicular to the axis of rotation may have different non-circular shapes. For example, the cross sections of the first cam portion and of the second cam portion may each have an oval shape, wherein the difference between the lengths of the principal axes of the oval cross section of the first cam portion is different from the difference between the lengths of the principal axes of the oval cross section of the second cam portion. Alternatively, it is conceivable that the cross sections of the first cam portion and of the second cam portion have the same shape but that both cam portions feature different eccentricities. Of course, it is likewise conceivable that the first cam portion and the second cam portion have both different shapes and different eccentricities. A person of ordinary skill readily understands that there is a variety of ways to shape the first cam portion and the second cam portion and/or to arrange the first cam portion and the second cam portion with respect to the axis of rotation in order to realize different piston strokes when driving the piston through the first cam portion and the second cam portion, respectively.

Further, the piston pump assembly comprising a piston with a variable stroke according the present disclosure may further comprise a motor such as an electric motor configured to drive the drive shaft. The cam is typically fixed to the drive shaft in a torque-proof manner. In other words, the cam is usually disposed on the drive shaft in such a way that it may not rotate with respect to the axis of rotation relative to the drive shaft. That is, the cam is usually disposed on the drive shaft in such a way that the drive shaft and the cam rotate together with respect to the axis of rotation.

Further, the cam may be particularly simple to manufacture and the assembly may have a compact design by integrally forming the first cam portion and the second cam portion. The cam may comprise or may be made of metal or a high grade plastic material. For example, the cam may extend in a direction perpendicular to the piston axis. The first cam portion and the second cam portion may then be formed in different sections of the cam along the direction perpendicular to the piston axis. Similarly, the cam may extend in a direction parallel to the axis of rotation. The first cam portion and the second cam portion may then be formed in different sections of the cam along the direction parallel to the axis of rotation.

Further, movement of the cam relative to the piston axis may be facilitated if the cam comprises a transition portion joining the first cam portion and the second cam portion, wherein an outer surface of the transition portion provides a continuous transition between an outer surface of the first cam portion and an outer surface of the second cam portion. In particular, the transition portion may be formed in one piece with the first cam portion and the second cam portion.

Further, the piston pump assembly comprising a piston with a variable stroke according the present disclosure may further comprise a housing. The drive shaft may be at least partially disposed or mounted within the housing. For example, the drive shaft may be supported by the housing by means of one or more bearings such as roller bearings or ball bearings. Similarly, the piston may be at least partially disposed or mounted within the housing. For example, the housing may form or comprise a cylinder inside which the piston is configured to reciprocate. In particular, the piston axis may be fixed with respect to the housing. The axis of rotation may likewise be fixed with respect to the housing.

Further, the drive shaft and the piston may be configured or disposed such that the piston axis is arranged perpendicular to the axis of rotation. In this case the difference between the first stroke associated with the first eccentricity and the second stroke associated with the second eccentricity is most pronounced. The cam and the drive shaft may be configured such that the cam is movable relative to the piston axis in a direction parallel to the axis of rotation of the drive shaft. For example, the cam and the drive shaft may be configured such that the cam may slide on the drive shaft, in particular in a direction parallel to the axis of rotation. For instance, the cam may comprise a recess or through boring extending through the cam and the drive shaft may reach through the recess or through boring. In that case, the drive shaft and the recess or through boring of the cam preferably have correspondingly shaped cross sections at least along an axial section of the drive shaft so that the cam may not rotate relative to the drive shaft, at least when the cam is disposed on said axial section of the drive shaft. For example, the drive shaft may comprise an axial section having a constant polygonal cross section (such as a triangular, quadratic, hexagonal, or the like) and the recess or through boring of the cam may have a correspondingly shaped polygonal cross section.

On the other hand, the cam may be fixed to the drive shaft so that the cam may not move relative to the drive shaft. For example, the cam may be welded to the drive shaft or the drive shaft and the cam may be formed or made in one piece. In this case, the drive shaft is configured to be movable relative to the piston axis, in particular in a direction parallel to the axis of rotation. For example, the above-described motor for driving the drive shaft may include a rotatable member featuring a recess and at least an axial section of the drive shaft may be movably received within the recess of the rotatable member. The recess of the rotatable member and said section of the drive shaft movably received within the recess of the rotatable member then preferably have correspondingly shaped cross sections so that torque may be transmitted from the rotatable member to the drive shaft for driving the drive shaft.

Further, the first stroke associated with the first cam portion may be smaller than the second stroke associated with the second cam portion, and the piston pump assembly may further comprise a first biasing member, in particular an elastic member such as a spring, the first biasing member biasing the cam toward the first position relative to the piston axis in which the cam is configured to drive the piston through the first cam portion associated with the first piston stroke. For example, the first biasing member may rest on or may be supported by a portion of the housing or a portion of the motor for driving the drive shaft. It is understood that the piston pump assembly may optionally comprise at least one second biasing member which may bias the cam toward one of the first position or the second position.

Further, the piston pump assembly comprising a piston with a variable stroke according the present disclosure may further comprise a solenoid and a magnet or magnetisable portion for moving either the cam alone relative to the piston axis, or for moving both the drive shaft and the cam fixed to the drive shaft relative to the piston axis. For example, the solenoid may be fixed to the housing and the magnet or magnetisable portion may be fixed to the cam/drive shaft, or vice versa.

Further, the piston pump assembly comprising a piston with a variable stroke according the present disclosure may comprise hydraulic actuator configured to move the cam relative to the piston axis. For example, the hydraulic actuator may comprise a hydraulic cylinder and a further piston movably disposed within the hydraulic cylinder and configured to be moved by a hydraulic pressure within the hydraulic cylinder. It is conceivable that the cam itself is configured to be moved by a hydraulic pressure acting on the cam. For example, the piston pump assembly may include a housing comprising a cam chamber. The cam chamber may be configured to be at least partially filled with a hydraulic fluid at least on one side of the cam. For example, the cam chamber may be in fluid communication with a source of hydraulic fluid such as a further pump or a further hydraulic cylinder for pressurizing the cam chamber. The cam may be movably disposed within the cam chamber. Also, the cam may be in sliding sealing engagement with an inner wall of the cam chamber such that the cam is configured to be moved relative to the piston axis by controlling a quantity of fluid and/or a hydraulic pressure within the cam chamber at least on one side of the cam. At low temperatures the viscosity of the hydraulic fluid or brake fluid to be displaced by the piston pump assembly may increase. In this situation it may be advantageous to decrease the piston stroke if it is not possible to increase the power of the motor driving the drive shaft. To that end the piston pump assembly may include a temperature sensor for measuring a temperature of the brake fluid or for measuring an ambient temperature, wherein the cam is configured to be placed selectively in one of the first position and the second position based on the measured temperature. For example, the piston pump assembly may comprise a control unit in communication with the temperature sensor. The control unit may then be configured to control the means for moving the cam relative to the piston axis, such as the above-described solenoid or the source of hydraulic pressure for pressurizing the cam chamber, based on the measured temperature.

Furthermore, a vehicle braking system comprising a piston pump assembly comprising a piston with a variable stroke according the present disclosure may comprise the above-described piston pump assembly and at least one brake cylinder in fluid communication with the piston pump assembly. The piston pump assembly is configured to control a hydraulic pressure applied to the brake cylinder to control a braking force applied to one or more vehicle wheels through the brake cylinder.

BRIEF DESCRIPTION OF THE DRAWINGS

Embodiments of a piston pump assembly comprising a piston with a variable stroke according the present disclosure and a vehicle braking system comprising the same are described in the following detailed description and depicted in the accompanying drawings of which:

FIG. 2b schematically illustrates views along the sections A-A and B-B depicted in FIG. 2a;

FIG. 5b schematically illustrates a sectional view of a cam of the piston pump assembly of FIG. 5a.

DETAILED DESCRIPTION

Figure 1:
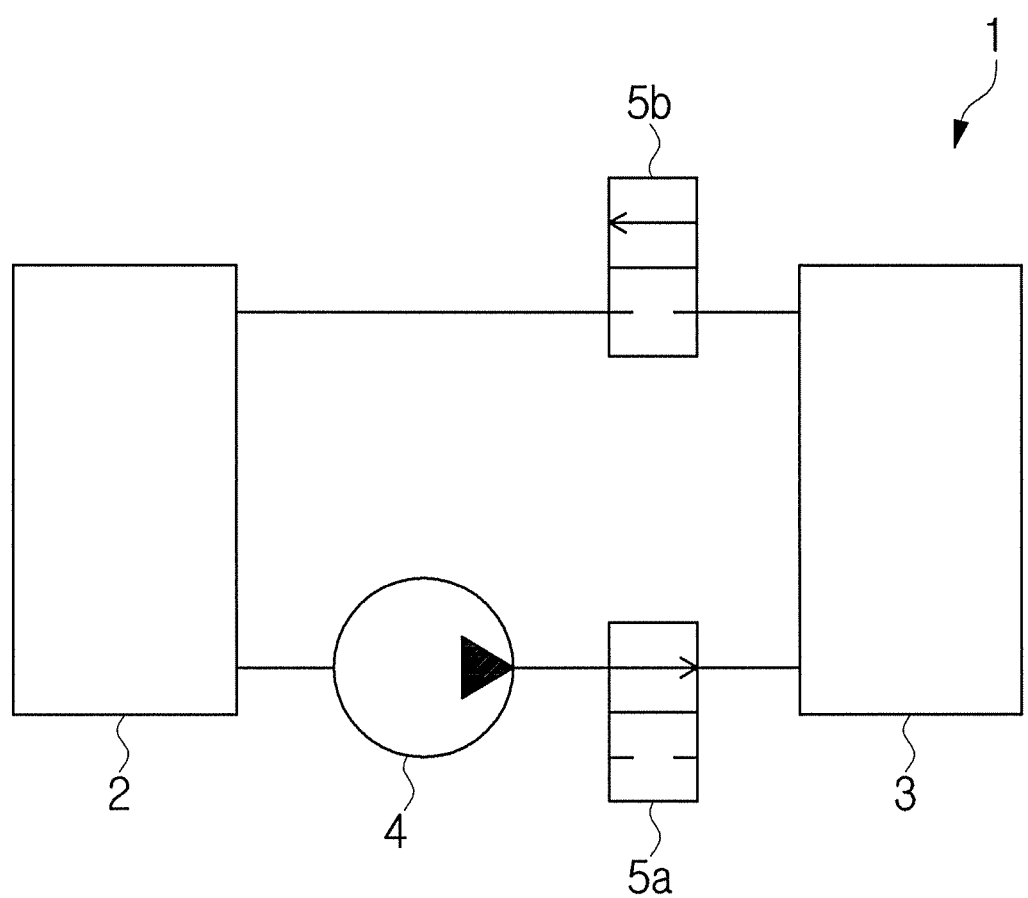
FIG. 1 schematically illustrates an embodiment of a braking system comprising a piston pump assembly in accordance with the present disclosure.

FIG. 1 schematically illustrates an embodiment of a braking system 1 for an automotive vehicle in accordance with the present disclosure. The braking system 1 may be an ABS or ESC braking system, for example. The braking system 1 comprises a low pressure brake fluid accumulator 2, a brake cylinder 3 configured to apply a braking force to a vehicle wheel (not shown), a piston pump assembly 4 and 2/2-way control valves 5a and 5b.

When the first control valve 5a is open and the second control valve 5b is closed, as shown in FIG. 1, the piston pump assembly 4 may displace or pump a brake fluid from the accumulator 2 to the brake cylinder 3, thereby increasing a hydraulic pressure in the brake cylinder 3 and a braking force applied to the vehicle wheel via the brake cylinder 3. To end the braking maneuver, the braking force may subsequently be lowered by reducing the hydraulic pressure in the brake cylinder 3.

To that end, the second control valve 5b may be opened (not shown) so that pressurized brake fluid from the brake cylinder 3 is displaced from the brake cylinder 3 to the accumulator 2. Additionally, the first control valve 5a may be closed (not shown) and the piston pump assembly 4 may stop pumping.

Figure 2A:
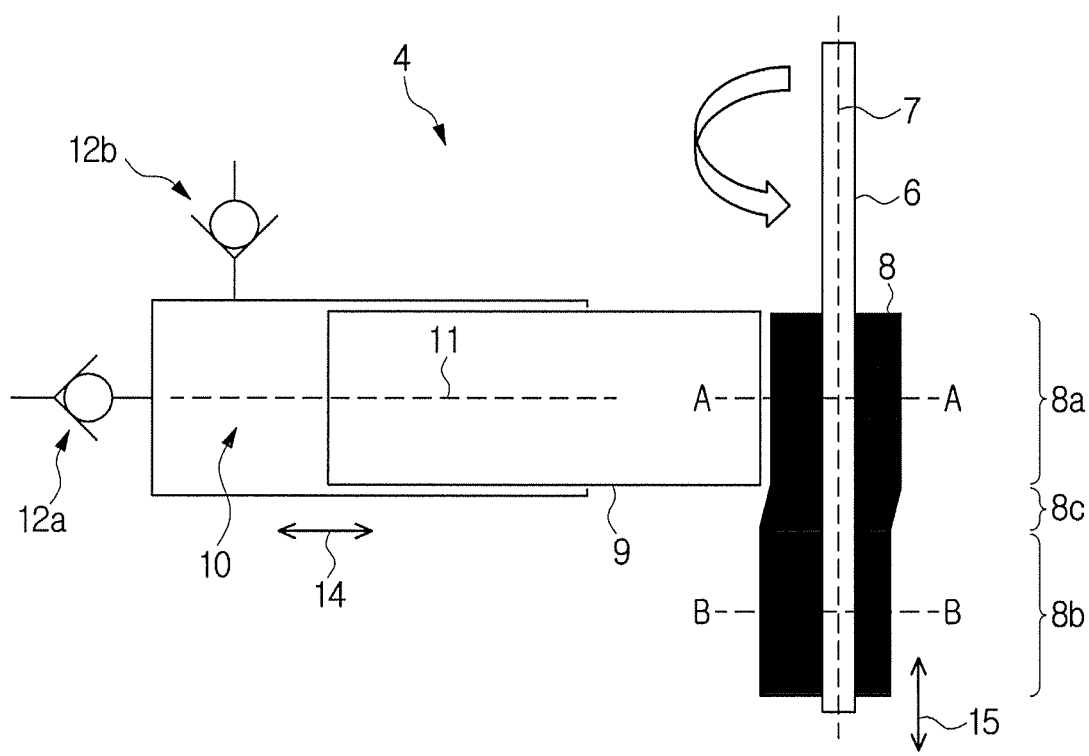
FIG. 2a schematically illustrates a sectional view of the piston pump assembly of FIG. 1 according to a first embodiment.

FIG. 2a schematically depicts a sectional view of the piston pump assembly 4 of FIG. 1 according to a first embodiment. Here and in the following recurring features are designated by the same reference signs. The piston pump assembly 4 comprises a drive shaft 6 defining an axis of rotation 7 of the drive shaft 6, a cam 8 disposed on the drive shaft 6, and a piston 9 partially disposed within a pump cylinder 10 and configured to reciprocate within the pump cylinder 10 along a piston axis 11. The piston pump assembly 4 typically further includes a motor, for example an electric motor (not shown), configured to drive the drive shaft 6. The drive shaft 6 and the piston 9 are configured such that the axis of rotation 7 and the piston axis 11 are arranged perpendicular to one another. For example, the axis of rotation 7 and the piston axis 11 may intersect one another.

Figure 2B:
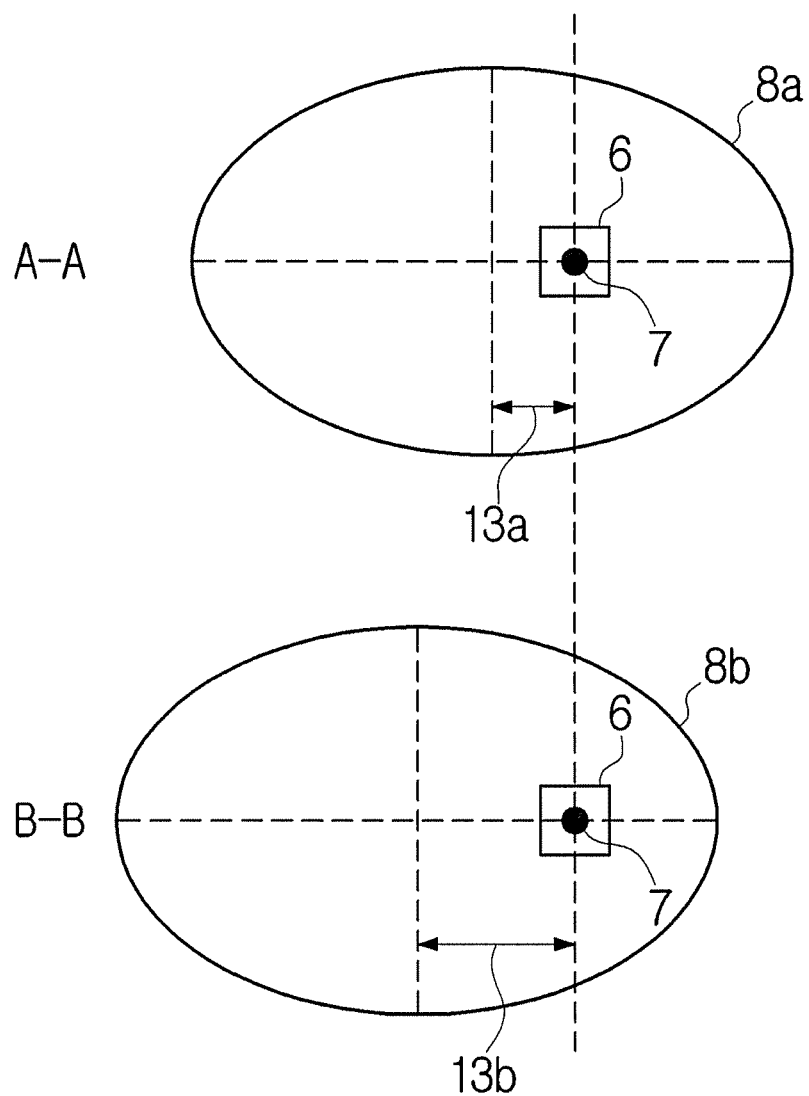

The cam 8 extends along the axis of rotation 7. The cam 8 comprises a first cam portion 8a extending along a first axial section of the cam 8, and a second cam portion 8b extending along a second axial section of the cam 8. FIG. 2b schematically depicts sectional views of the cam 8 along the sectional plane A-A extending through the first cam portion 8a and along the sectional plane B-B extending through the second cam portion 8b, wherein the drawing plane in FIG. 2b is arranged perpendicular to the axis of rotation 7. Herein, a cross section of the first cam portion 8a and a cross section of the second cam portion 8b perpendicular to the axis of rotation 7 each have a non-circular shape, in particular an oval shape. However, it is understand that in alternative embodiments not explicitly depicted here the first cam portion 8a and the second cam portion 8b may have other shapes.

The first cam portion 8a features a first eccentricity 13a with respect to the axis of rotation 7, and the second cam portion 8b features a second eccentricity 13b with respect to the axis of rotation 7 (see FIG. 2b). The second eccentricity 13b of the second cam portion 8b is greater than the first eccentricity 13a of the first cam portion 8a. In the embodiment depicted in FIGS. 2a and 2b both eccentricities 13a and 13b have a non-zero value. However, it is understood that in alternative embodiments not explicitly depicted here one of the first and second cam portions 8a and 8b may have a vanishing eccentricity. The cam 8 further comprises a transition portion 8c extending between the first cam portion 8a and the second cam portion 8b along the axis of rotation 7 and joining the first cam portion 8a and the second cam portion 8b. An outer surface of the transition portion 8c provides a continuous transition between an outer surface of the first cam portion 8a and an outer surface of the second cam portion 8b. The cam portions 8a to 8c are formed in one piece. For example, the cam 8 may be made of metal or of a high grade plastic.

The cam 8 is disposed on the drive shaft 6 in a torque-proof manner. That is, the drive shaft 6 and the cam 8 rotate together with respect to the axis of rotation 7. For example, the drive shaft 6 may have a polygonal cross section in a plane perpendicular to the axis of rotation 7, and the cam 8 may have a recess or through boring extending through the cam 8, the recess having a correspondingly shaped polygonal cross section in a plane perpendicular to the axis of rotation 7 so that the drive shaft 6 reaches through the recess or through boring of the cam 8. In FIG. 2b the drive shaft 6 and the corresponding recess extending through the cam 8 have quadratic cross sections. However, it is understood that they may have differently shaped cross sections that guarantee a torque-proof mounting of the cam 8 on the drive shaft 6.

The piston pump assembly 4 further includes a biasing mechanism (not shown) that constantly biases the piston 9 towards the cam 8 so that the piston 9 is constantly in contact with the cam 8. For example, the biasing mechanism may comprise a spring constantly biasing the piston 9 toward the cam 8. Due to the fact that the cam 8 features a non-circular cross section and is disposed on the drive shaft 6 in a torque-proof manner, and due to the fact that the piston 9 is biased toward the cam 8, rotation of the drive shaft 6 causes the piston 9 to perform a reciprocating movement along the piston axis 11, as indicated at 14 in FIG. 2a.

In the embodiment shown in FIG. 2a the pump cylinder 10 is in fluid communication with the accumulator 2 via a first check valve 12a and with the brake cylinder 3 via a second check valve 12b. The first check valve 12a is configured to allow a flow of fluid from the accumulator 2 to the pump cylinder 10 and to block a flow of fluid from the pump cylinder 10 to the accumulator 2. And the second check valve 12b is configured to allow a flow of fluid from the pump cylinder 10 to the brake cylinder 3 and to block a flow of fluid from the brake cylinder 3 to the pump cylinder 10. That is, movement of the piston 9 toward the right in FIG. 2a causes brake fluid to be displaced from the accumulator 2 to the pump cylinder 10, and provided the first control valve 5a is open movement of the piston 9 toward the left in FIG. 2a causes brake fluid to be displaced from the pump cylinder 10 to the brake cylinder 3. In this way, a reciprocating linear movement of the piston 9 along the piston axis 11 may cause brake fluid from the accumulator 2 to be displaced to the brake cylinder 3.

In FIG. 2a the cam 8 is shown in a first position relative to the piston axis 11 so that the piston 9 is biased toward the first cam portion 8a and the cam 8 is configured to drive the piston 9 through the first cam portion 8a. Thus, in the configuration depicted in FIG. 2a rotation of the drive shaft 6 results in a reciprocating movement of the piston 9 with a first stroke, wherein the first stroke is determined by the non-circular shape of the cross section of the first cam portion 8a perpendicular to the axis of rotation 7 and by the value of the first eccentricity 13a (FIG. 2b).

In the embodiment of the piston pump assembly 4 depicted in FIG. 2a the cam 8 is movable relative to the piston axis 11, in particular in a direction parallel to the axis of rotation 7. For example, in some embodiments the cam 8 may be configured to slide on the drive shaft 6. In other embodiments, the cam 8 may be fixed to the drive shaft 6. Then, both the drive shaft 6 and the cam 8 fixed to the drive shaft 6 may be moved relative to the piston axis 11. Various means that may be used to move the cam 8 relative to the piston axis 11 are described in more detail further below.

As indicated at 15 in FIG. 2a, the cam 8 is configured to be moved upward and to be placed in a second position relative to the piston axis 11 (not shown). When placed in the second position relative to the piston axis 11, the cam 8 is disposed such that the piston 9 is biased toward the second cam portion 8b and the cam 8 is configured to drive the piston 9 through the second cam portion 8b. In this configuration rotation of the drive shaft 6 results in a reciprocating movement of the piston 9 with a second stroke, wherein the second stroke is determined by the non-circular shape of the cross section of the second cam portion 8b perpendicular to the axis of rotation 7 and by the value of the second eccentricity 13b (FIG. 2b). In the embodiment depicted in FIGS. 2a and 2b the second stroke is greater than the first stroke.

Figure 2C:
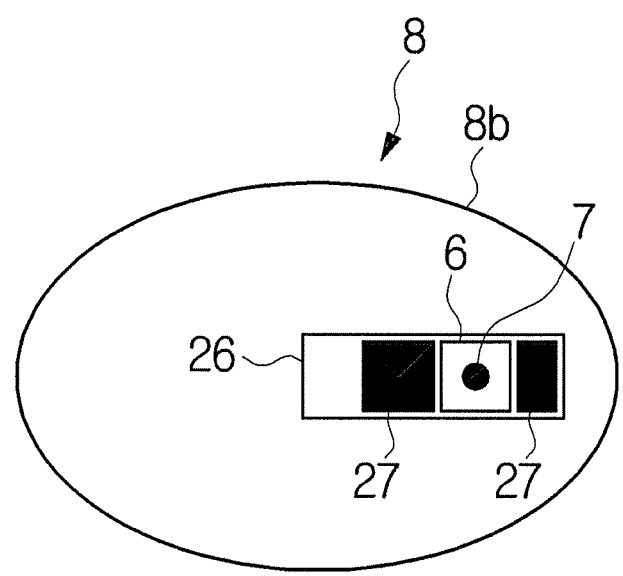
FIG. 2c schematically illustrates a variant of the section B-B depicted in FIG. 2b.

FIG. 2c illustrates a variant of the section B-B of the cam 8 depicted in FIG. 2b. Herein, the cam 8 comprises a recess 26 extending through the cam 8 in a direction parallel to the axis of rotation 7. At least in one direction perpendicular to the axis of rotation 7 an extension of the recess 26 is larger than an extension of the drive shaft 6. During production this allows tuning the eccentricity of the cam 8 by fixing the drive shaft 6 within the recess 26 using filling elements 27 of an appropriate size. The filling elements 27 may be fixed within the recess by bolting or welding, for example. However, it is understood that other means may be used to fix the filling elements 27 within the recess 26.

Figure 3A:
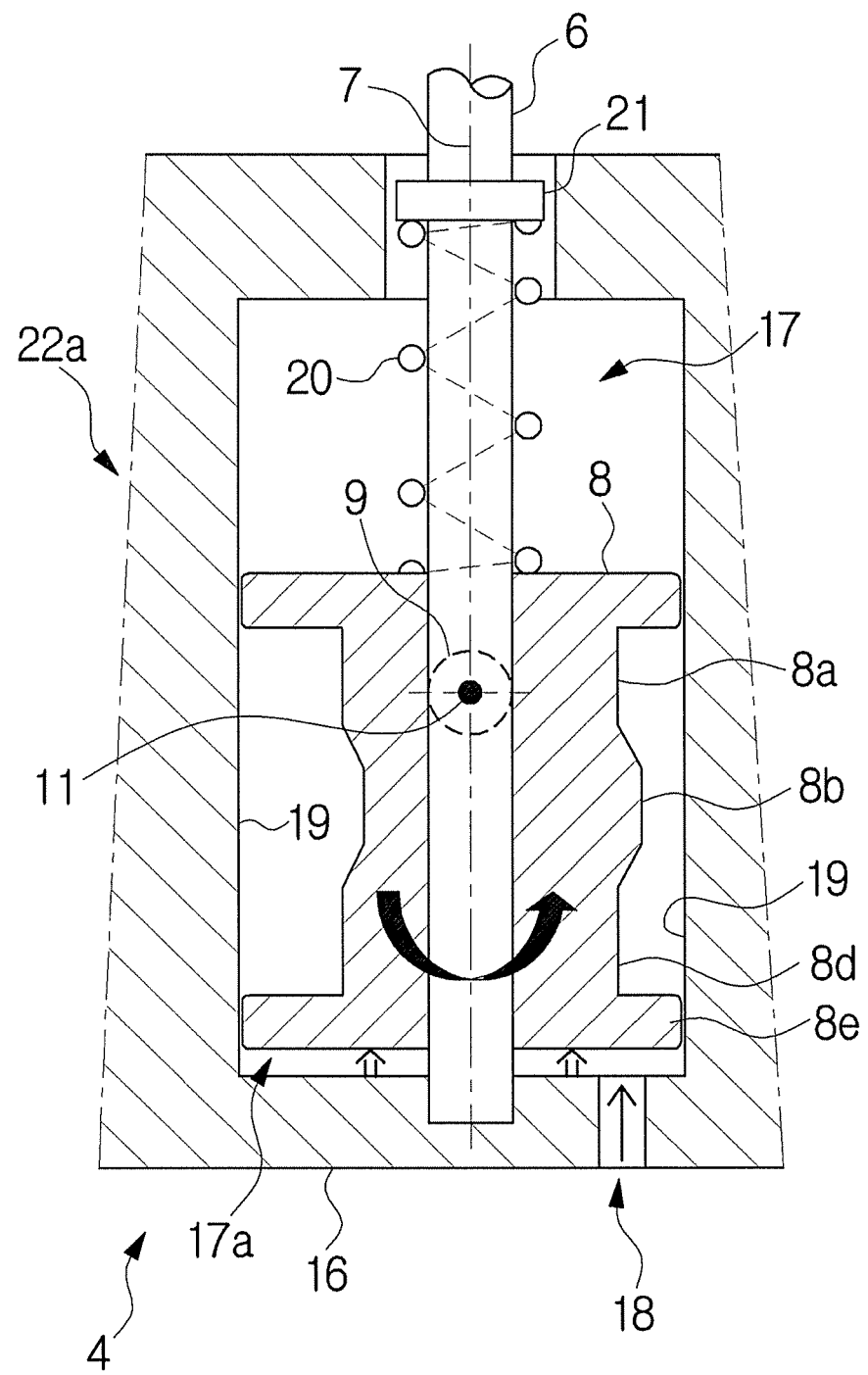
FIGS. 3a to 3c schematically illustrate sectional views of the piston pump assembly of FIG. 1 according to a second embodiment.
Figure 3B:
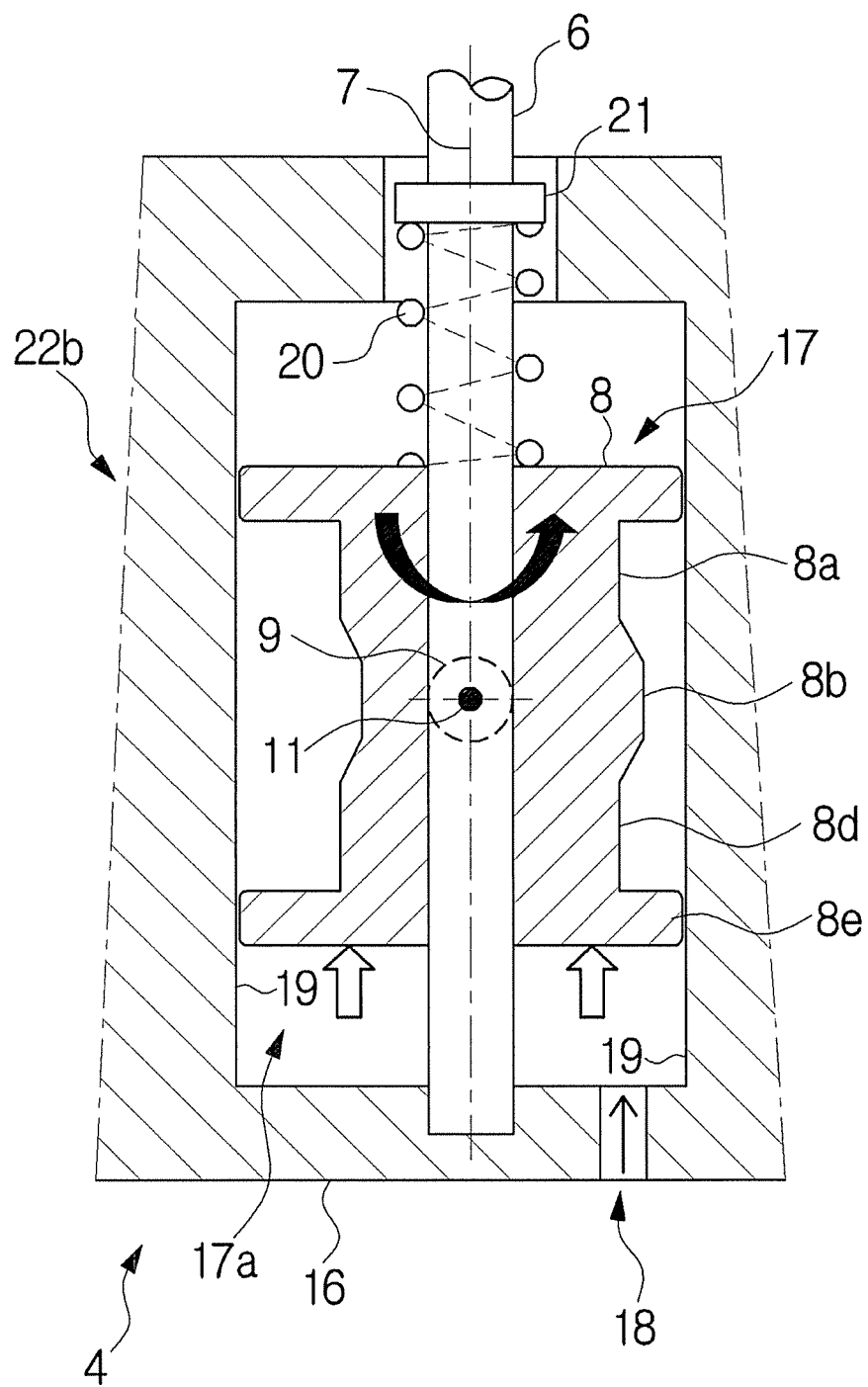
Figure 3C:
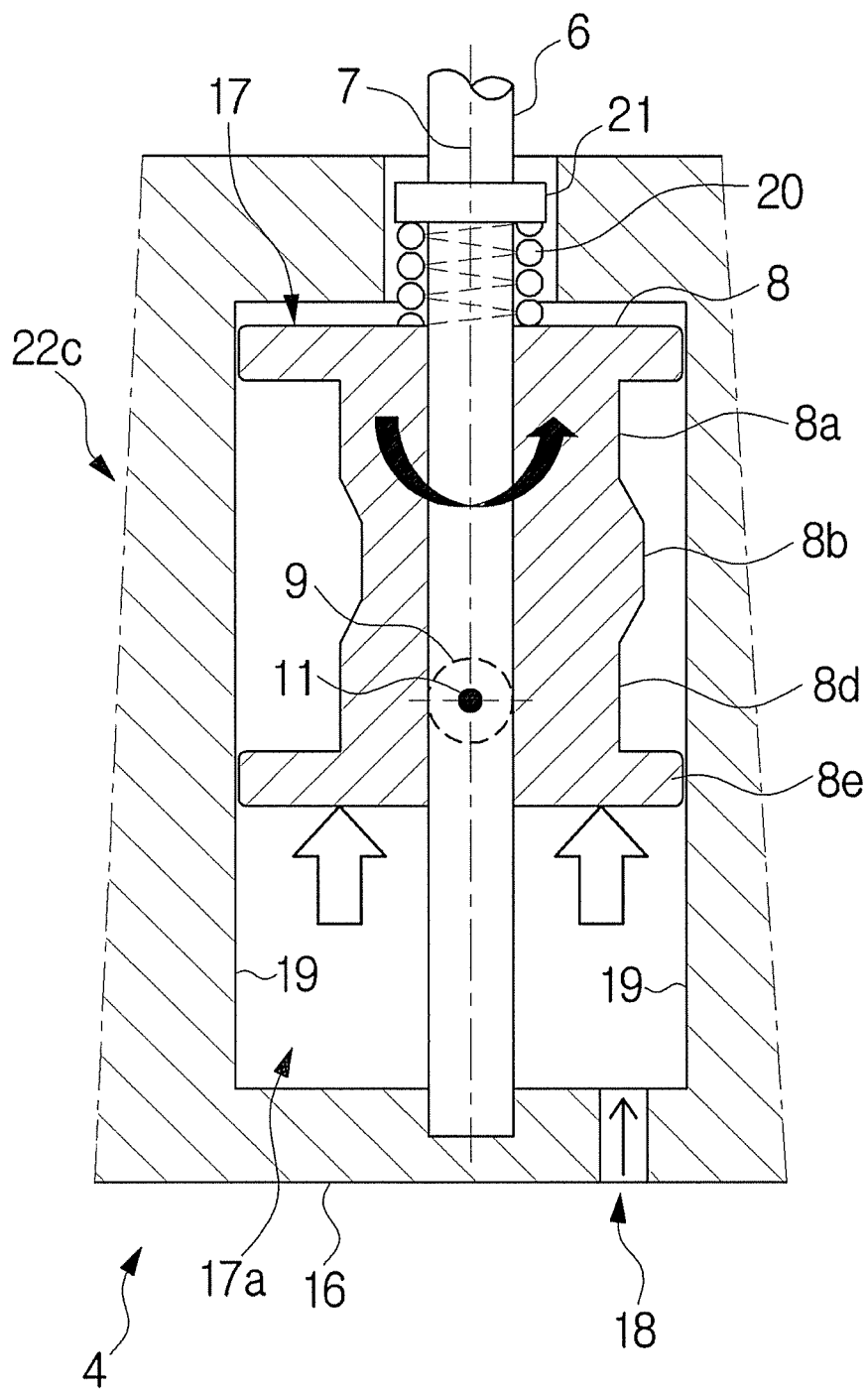

FIGS. 3a to 3c schematically depict sectional views of the piston pump assembly 4 of FIG. 1 according to a second embodiment. The drawing plane of FIGS. 3a to 3c is arranged perpendicular to the drawing plane of FIG. 2a. In particular, in FIGS. 3a to 3c the piston axis 11 is arranged perpendicular to the drawing plane of FIGS. 3a to 3c. For brevity, only the differences between the embodiment shown in FIGS. 3a to 3c and the embodiment shown in FIGS. 2a and 2b will be described in detail.

The piston pump assembly 4 according to FIGS. 3a to 3c comprises a housing 16. The housing 16 may be made of metal or of a high grade plastic. However, it is understood that the housing 16 may be made of other materials. The drive shaft 6 is rotatably mounted in the housing 16, for example by one or more bearings. A cam chamber 17 is formed inside the housing 16. The drive shaft 6 extends through the cam chamber 17. The cam 8 is movably disposed within the cam chamber 17. In particular, the cam 8 is mounted on the drive shaft 6 in such a way that it may slide on the drive shaft 6 in a direction parallel to the axis of rotation 7. The cam chamber 17 may be at least partially filled with a hydraulic fluid via a channel 18 extending through the wall of the housing 16. For example, the cam chamber 17 may be in fluid communication with a source of pressurized fluid such as a pump or a further hydraulic piston (not shown). In particular, the channel 18 is in fluid communication with a first section 17a of the cam chamber 17. The first section 17a of the cam chamber 17 extends below the cam 8 in FIGS. 3a to 3c.

The cam 8 has a bottom portion 8e. In a plane perpendicular to the axis of rotation 7 a cross section of the bottom portion 8e of the cam 8 is complementary to the shape of the cam chamber 17. The bottom portion 8e is in sliding sealing engagement with an inner wall 19 of the housing 16. The inner wall 19 of the housing 16 delimits the cam chamber 17. Additionally, sealing means such as a sealing ring may be disposed between the bottom portion 8e of the cam 8 and the inner wall 19 delimiting the cam chamber 17. The cam 8 may be moved in a direction parallel to the axis of rotation 7 by controlling a quantity of fluid and/or a hydraulic pressure in the first section 17*a* of the cam chamber 17. For example, in the embodiment shown in FIGS. 3*a* to 3*c* the cam 8 may be moved upward by increasing the quantity of fluid and/or the hydraulic pressure in the first section 17*a* of the cam chamber 17. Similarly, the cam 8 may be moved downward by reducing the quantity of fluid and/or the hydraulic pressure in the first section 17*a* of the cam chamber 17.

The embodiment of the piston pump assembly 4 shown in FIGS. 3*a* to 3*c* further includes a biasing member 20 biasing the cam 8 downward. The biasing member 20 may be configured as an elastic member such as a spring, for example. The biasing member 20 is supported by a portion 21 that is fixed to the drive shaft 6. In alternative embodiments not explicitly depicted here, the biasing member 20 may likewise be supported by the housing 16.

The cam 8 according to FIGS. 3*a* to 3*c* comprises three cam portions 8*a*, 8*b* and 8*d*. The cam portions 8*a*, 8*b* and 8*d* according to FIGS. 3*a* to 3*c* are formed in one piece. In a plane perpendicular to the axis of rotation 7 the first cam portion 8*a* and the third cam portion 8*d* according to FIGS. 3*a* to 3*c* may have a cross section and an eccentricity similar to the cross section and the eccentricity of the first cam portion 8*a* shown in FIG. 2*b*, and the second cam portion 8*b* may have a cross section and an eccentricity similar to the cross section and the eccentricity of the second cam portion 8*b* shown in FIG. 2*b*.

In FIG. 3*a* a volume of fluid in the first section 17*a* of the cam chamber 17 and the hydraulic pressure in the first section 17*a* of the cam chamber 17 have values $V_1$ and $p_1$, respectively, and the biasing member 20 biases the cam 8 toward a first position 22*a* at a first distance $s_1$ from the piston axis 11. For example, the distance of the cam 8 from the piston axis 11 may be defined as the distance of the bottom portion 8*e* of the cam 8 from the piston axis 11 measured along a direction parallel to the axis of rotation 7. In the first position 22*a* depicted in FIG. 3*a* the cam 8 is configured to drive the piston 9 through the first cam portion 8*a*. That is, in the first position 22*a* depicted in FIG. 3*a* rotation of the drive shaft 6 results in a reciprocating linear movement of the piston 9 with a first piston stroke.

In FIG. 3*b* the volume of fluid in the first section 17*a* of the cam chamber 17 and the hydraulic pressure in the first section 17*a* of the cam chamber 17 have values $V_2$ and $p_2$, respectively, acting against the biasing member 20 and forcing the cam 8 toward a second position 22*b* at a second distance $s_2$ from the piston axis 11, wherein $V_2 > V_1$, $p_2 > p_1$, and $s_2 < s_1$. In the second position 22*b* depicted in FIG. 3*b* the cam 8 is configured to drive the piston 9 through the second cam portion 8*b*. That is, in the second position 22*b* depicted in FIG. 3*b* rotation of the drive shaft 6 results in a reciprocating linear movement of the piston 9 with a second piston stroke, wherein the second piston stroke is greater than the first piston stroke.

In FIG. 3*c* the volume of fluid in the first section 17*a* of the cam chamber 17 and the hydraulic pressure in the first section 17*a* of the cam chamber 17 have values $V_3$ and $p_3$, respectively, acting against the biasing member 20 and forcing the cam 8 toward a third position 22*c* at a third distance $s_3$ from the piston axis 11, wherein $V_3 > V_2$, $p_3 > p_2$, and $s_3 < s_2$. In the third position 22*c* depicted in FIG. 3*c* the cam 8 is configured to drive the piston 9 through the third cam portion 8*c*. That is, in the third position 22*c* depicted in FIG. 3*c* rotation of the drive shaft 6 results in a reciprocating linear movement of the piston 9 with a third piston stroke, wherein in the embodiment shown in FIGS. 3*a* to 3*c* the third piston stroke may be identical to the first piston stroke.

The piston pump assembly 4 of FIGS. 3*a* to 3*c* may further include a temperature sensor (not shown) for measuring the temperature of the braking system 1, and a control unit (not shown) in communication with the temperature sensor. The control unit may be configured to control the hydraulic pressure in the first section 17*a* of the cam chamber 17 based on the measured temperature. For example, the control unit may be configured to move the cam 8 to the first position 22*a* when or once the measured temperature is below a first threshold temperature value. This way, it is ensured that at low temperatures when the viscosity of the brake fluid in the braking system 1 is high the piston pump assembly 4 operates at a small piston stroke. Similarly, the control unit may be configured to move the cam 8 to the second position 22*b* when or once the measured temperature is above a second threshold temperature value, wherein the second threshold temperature value is equal to or higher than the first threshold temperature value. This way, it is ensured that at high temperatures when the viscosity of the brake fluid in the braking system 1 is low the piston pump assembly 4 operates at a large piston stroke.

Figure 4A:
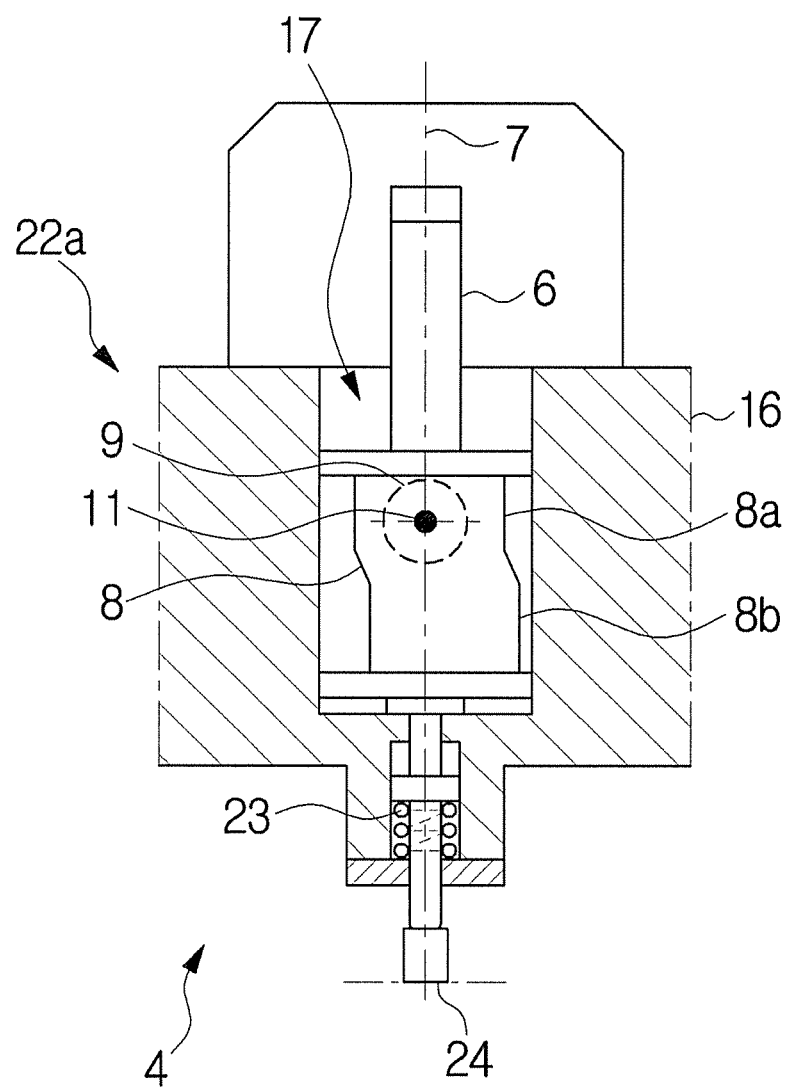
FIGS. 4a and 4b schematically illustrate sectional views of the piston pump assembly of FIG. 1 according to a third embodiment.
Figure 4B:
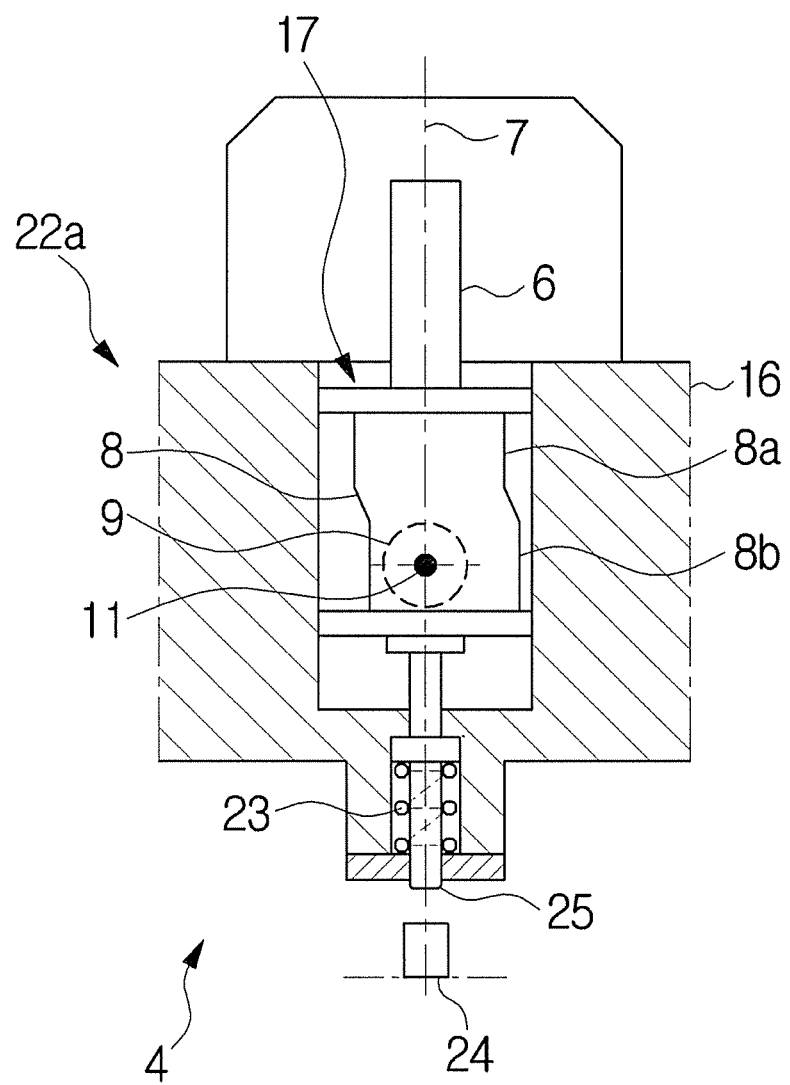
Figure 4C:
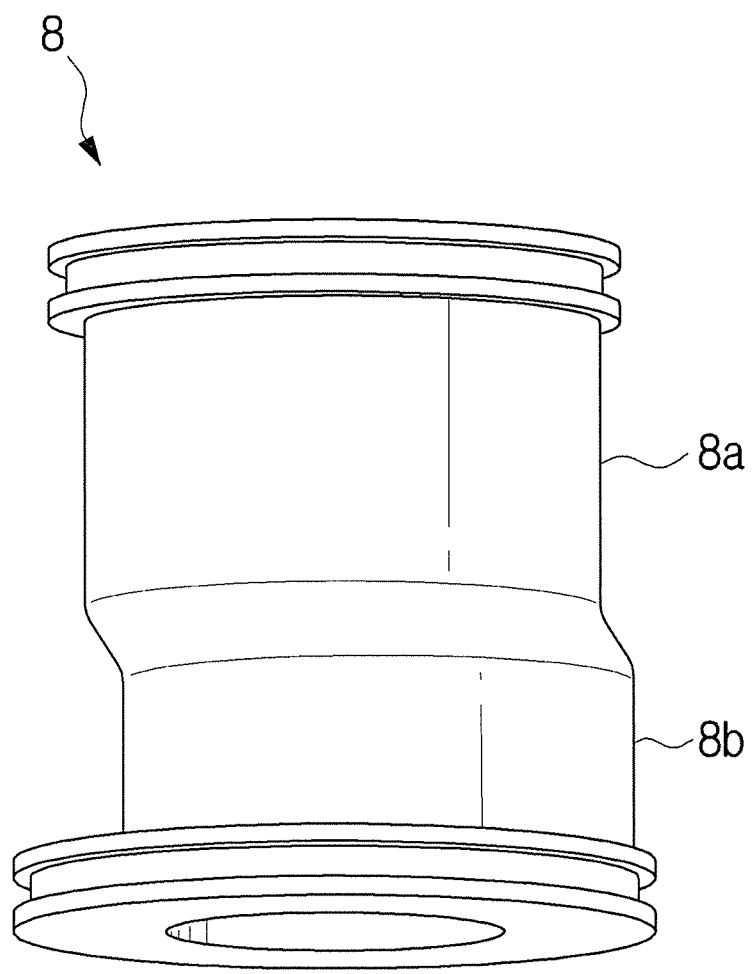
FIG. 4c schematically illustrates a perspective view of a cam of the piston pump assembly of FIGS. 4a and 4b.

FIGS. 4*a* and 4*b* schematically depict sectional views of the piston pump assembly 4 of FIG. 1 according to a third embodiment. FIG. 4*c* illustrates a perspective view of the cam 8 shown in FIGS. 4*a* and 4*b*. Again, the drawing plane of FIGS. 4*a* and 4*b* is arranged perpendicular to the drawing plane of FIG. 2*a* so that the piston axis 11 is arranged perpendicular to the drawing plane of FIGS. 4*a* and 4*b*. For brevity, only the differences between the embodiment shown in FIGS. 4*a* and 4*b* and the embodiment shown in FIGS. 3*a* to 3*c* will be described in detail.

The embodiment of the piston pump assembly 4 according to FIGS. 4*a* and 4*b* differs from the embodiment of the piston pump assembly 4 according to FIGS. 3*a* to 3*c* in that the cam 8 is fixed to the drive shaft 6. For example, the cam 8 may be welded or bolted to the drive shaft 6. However, it is understood that the cam 8 may be fixed to the drive shaft 6 using other means. In the embodiment depicted in FIGS. 4*a* and 4*b* both the drive shaft 6 and the cam 8 fixed to the drive shaft 6 may be moved relative to the piston axis 11, in particular in a direction parallel to the axis of rotation 7.

As opposed to the cam 8 according to FIGS. 3*a* to 3*c* the cam 8 according to FIGS. 4*a* and 4*b* is not configured to be moved by hydraulic forces. Rather, in order to move the drive shaft 6 and the cam 8 relative to the piston axis 11 the embodiment of the piston pump assembly 4 according to FIGS. 4*a* and 4*b* comprises a solenoid 24 and a magnetisable portion 25. The magnetisable portion 25 may also include a permanent magnet. In particular, the solenoid 24 may be fixed relative to the housing 16 and the magnetisable portion 25 may be fixed to the drive shaft 6. The solenoid 24 and the magnetisable portion 25 may be configured such that as an electric current flows through the solenoid 24 the drive shaft 6 and the cam 8 fixed to the drive shaft 6 are moved downward to force the cam 8 in the first position 22*a* relative to the piston axis 11 (FIG. 4*a*), against the force of a biasing member 23 biasing the cam 8 toward the second position 22*b* relative to the piston axis 11 (FIG. 4*b*). The biasing member 23 is supported by the housing 16 or by an element fixed to the housing 16. As before, in FIGS. 4*a* and 4*b* the first position 22*a* of the cam 8 is associated with the first piston stroke, and the second position 22*b* of the cam 8 is associated with the second piston stroke, wherein the first piston stroke is smaller than the second piston stroke.

Figure 5A:
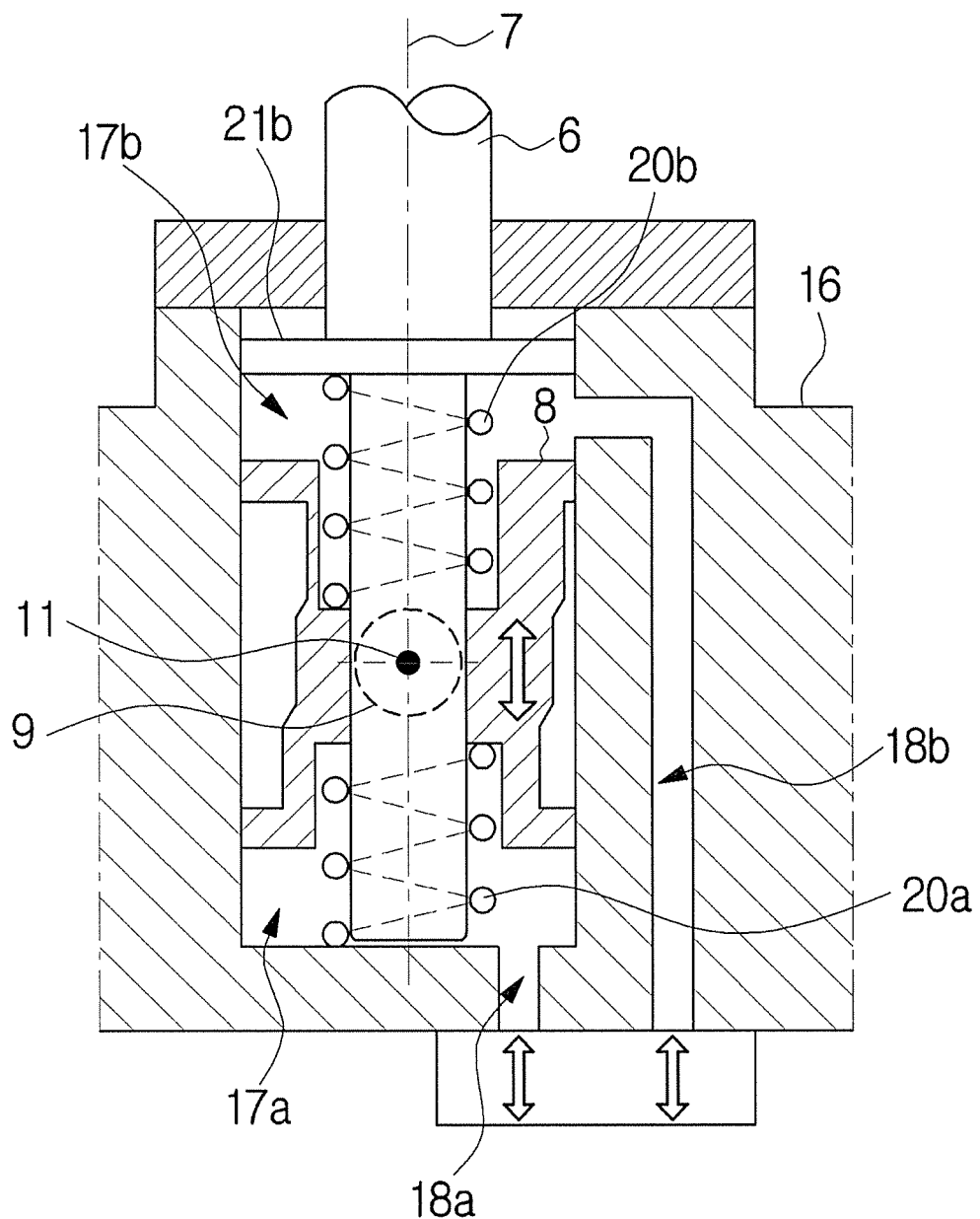
FIG. 5a schematically illustrates a sectional view of the piston pump assembly of FIG. 1 according to a fourth embodiment.
Figure 5B:
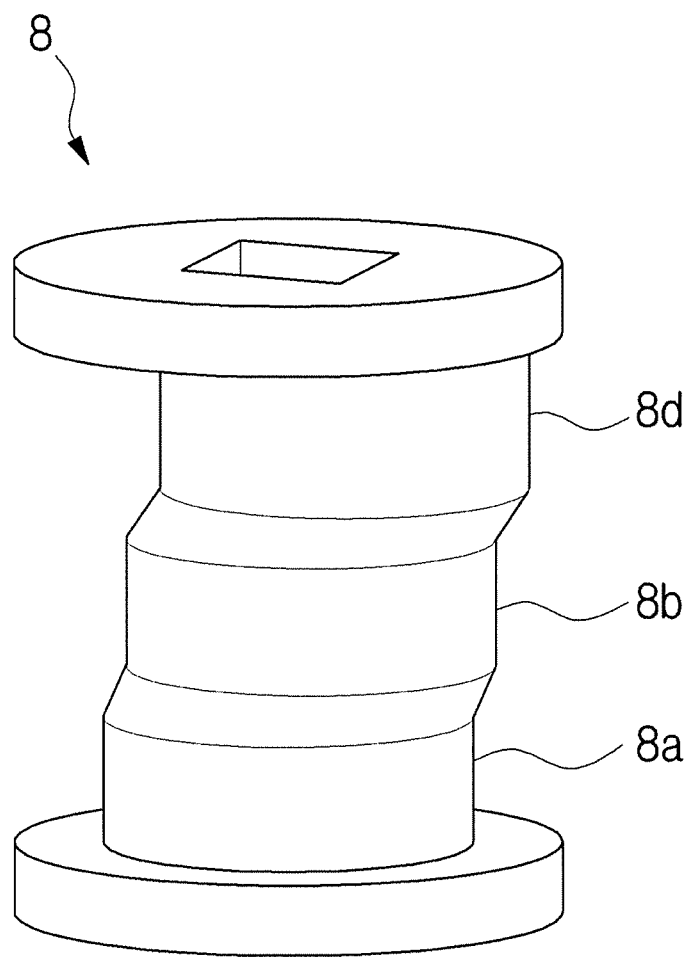

FIG. 5*a* schematically depicts a sectional view of the piston pump assembly 4 of FIG. 1 according to a fourth embodiment. FIG. 5*b* illustrates a perspective view of the cam 8 shown in FIG. 5*a*. Again, the drawing plane of FIG. 5*a* is arranged perpendicular to the drawing plane of FIG. 2*a* so that the piston axis 11 (not shown) is arranged perpendicular to the drawing plane of FIG. 5*a*. The embodiment of the piston pump assembly 4 according to FIG. 5*a* is similar to the one depicted in FIGS. 3*a* to 3*c*. For brevity, only the differences between the embodiment shown in FIG. 5*a* and the embodiment shown in FIGS. 3*a* to 3*c* will be described in detail.

The embodiment of the piston pump assembly 4 according to FIG. 6*a* differs from the embodiment of the piston pump assembly 4 according to FIGS. 3*a* to 3*c* in that both the first section 17*a* of the cam chamber 17 below the cam 8 and a second section 17*b* of the cam chamber 17 above the cam 8 are in fluid communication with one or more sources of hydraulic fluid via channels 18*a* and 18*b* in the wall of the housing 16. As in FIGS. 3*a* to 3*c* the cam 8 may slide on the drive shaft 6 in a direction parallel to the axis of rotation 7. The position of the cam 8 relative to the drive shaft 6 and relative to the piston axis 11 may be controlled by varying a quantity and/or a hydraulic pressure of the hydraulic fluid in the sections 17*a* and 17*b* of the cam chamber 17. A biasing member 20*a* biases the cam 8 upward, and a biasing member 20*b* biases the cam 8 downward. The biasing member 20*a* is supported by the housing 16, and the biasing member 20*b* is supported by a portion 21*b* fixed to the drive shaft 6.

The embodiment of the piston pump assembly 4 according to FIG. 5*a* further differs from the embodiment of the piston pump assembly 4 according to FIGS. 3*a* to 3*c* in that an eccentricity of the third cam section 8*d* is larger than the eccentricity of the second cam section 8*b* so that the piston stroke associated with the third cam section 8*d* is larger than the piston stroke associated with the second cam section 8*b*.

What is claimed is:

1. A piston pump assembly comprising a piston with a variable stroke for use in a hydraulic braking system, comprising:
    a rotatable drive shaft defining an axis of rotation of the rotatable drive shaft;
    a cam disposed on the drive shaft; and
    a piston biased toward the cam and configured to reciprocate along a piston axis for displacing a hydraulic fluid,
    wherein the cam is configured to transform a rotating movement of the drive shaft into a linear movement of the piston,
    wherein the cam is movable relative to the piston axis and configured to be selectively placed in a first position at a first distance from the piston axis or a second position at a second distance from the piston axis,
    wherein the cam comprises at least two portions each of which has, at a given position of the cam relative to the piston axis, at least one of a different non-circular cross section in a plane perpendicular to the axis of rotation or a different eccentricity with respect to the axis of rotation,
    wherein the at least two portions of the cam comprises at least a first cam portion having a first non-circular cross section and/or a first eccentricity, and a second cam portion having a second non-circular cross section and/or a second eccentricity,
    wherein the cam and the piston are configured such that, when the cam is placed in the first position at the first distance from the piston axis, the cam drives the piston through the first cam portion, resulting in a piston movement having a first stroke,
    wherein the cam and the piston are configured such that, when the cam is placed in the second position at the second distance from the piston axis, the cam drives the piston through the second cam portion, resulting in a piston movement having a second stroke different from the first stroke,
    wherein the first stroke associated with the first cam portion is smaller than the second stroke associated with the second cam portion, and
    wherein the piston pump assembly further comprises a biasing member, the biasing member comprising an elastic member including a spring, and the biasing member biasing the cam toward the first position relative to the piston axis in which the cam is configured to drive the piston through the first cam portion associated with the first stroke.

2. The piston pump assembly according to claim 1, wherein the first cam portion and the second cam portion are formed in one piece.

3. The piston pump assembly according to claim 2, wherein the cam comprises a transition portion joining the first cam portion and the second cam portion, and an outer surface of the transition portion provides a continuous transition between an outer surface of the first cam portion and an outer surface of the second cam portion.

4. The piston pump assembly according to claim 1, further comprising a housing, wherein the piston axis is fixed with respect to the housing.

5. The piston pump assembly according to claim 1, wherein the piston axis is arranged perpendicular to the axis of rotation.

6. The piston pump assembly according to claim 1, wherein the cam is movable relative to the piston axis in a direction parallel to the axis of rotation.

7. The piston pump assembly according to claim 1, wherein the cam is configured to slide on the drive shaft, in particular in a direction parallel to the axis of rotation.

8. The piston pump assembly according to claim 1, wherein the cam is fixed to the drive shaft, and wherein the drive shaft is movable relative to the piston axis.

9. The piston pump assembly according to claim 1, further comprising a solenoid and a magnet or a magnetisable portion configured to move the cam relative to the piston axis.

10. The piston pump assembly according to claim 1, further comprising a hydraulic actuator configured to move the cam relative to the piston axis.

11. The piston pump assembly according to claim 1, further comprising a housing including a cam chamber, wherein the cam is movably disposed within the cam chamber and in sliding sealing engagement with an inner wall of the cam chamber, and wherein the cam chamber is configured to be at least partially filled with a hydraulic fluid at least on one side of the cam, such that the cam is configured to be moved relative to the piston axis by controlling a quantity of fluid and/or a hydraulic pressure within the cam chamber.

12. The piston pump assembly according to claim 1, further comprising a temperature sensor for measuring a temperature of a brake fluid or for measuring an ambient temperature, wherein the cam is configured to be placed in selected one of the first position and the second position based on the measured temperature.

13. A braking system for a vehicle comprising at least one brake cylinder and at least one piston pump assembly having a piston with a variable stroke according to claim 1 in fluid communication with the brake cylinder for controlling a hydraulic pressure in the brake cylinder.

* * * * *